United States Patent [19]

Kaku et al.

[11] Patent Number: 4,835,756
[45] Date of Patent: May 30, 1989

[54] OPTICAL MEMORY APPARATUS USING AN OPTICAL DISC HAVING GUIDE-GROOVES OF V-SHAPE AND PREDETERMINED OPTICAL DEPTH AND ACCESS METHOD THEREFOR

[75] Inventors: Toshimitsu Kaku, Sagamihara; Takeshi Maeda, Kokubunji; Shigeru Nakamura, Tachikawa; Masaru Ito, Sagamihara; Kazuo Shigematsu, Saitama; Yoshito Tsunoda, Mitaka, all of Japan

[73] Assignee: Hitachi, Ltd., Tokyo, Japan

[21] Appl. No.: 32,506

[22] Filed: Mar. 31, 1987

[30] Foreign Application Priority Data

Mar. 31, 1986 [JP] Japan .................................. 61-70971

[51] Int. Cl.⁴ ........................................... G11B 7/095
[52] U.S. Cl. ..................................... 369/44; 369/109; 369/111; 369/275
[58] Field of Search ................. 369/44, 109, 111, 124, 369/275

[56] References Cited

U.S. PATENT DOCUMENTS

| | | | |
|---|---|---|---|
| 3,931,459 | 1/1976 | Korpel | 369/109 |
| 4,517,668 | 5/1985 | Takaoka et al. | 369/111 |
| 4,587,648 | 5/1986 | Ando | 369/275 |
| 4,607,358 | 8/1986 | Maeda et al. | 369/44 |
| 4,730,294 | 3/1988 | Funada | 369/124 |
| 4,731,771 | 3/1988 | Maeda et al. | 369/32 |
| 4,744,070 | 5/1988 | Takemura et al. | 369/44 |

FOREIGN PATENT DOCUMENTS

| | | | |
|---|---|---|---|
| 187604 | 11/1982 | Japan . | |
| 296535 | 12/1986 | Japan | 369/109 |

*Primary Examiner*—William H. Beha, Jr.
*Attorney, Agent, or Firm*—Antonelli, Terry & Wands

[57] ABSTRACT

An optical memory apparatus employs an optical disc having a plurality of guide-grooves in spiral and concentrical form and a plurality of flat tracks each arranged between adjacent two of the guide-grooves for recording information thereon, and the depth of the guide-grooves is suitably selected to increase the degree of modulation of a track cross signal, thereby performing a stable cross track counting by the use of the track cross signal and a tracking signal. One feature of the invention relies in that the modulation degree of the track cross signal is in the range between 30 and 60%. A second feature of the invention is that the guide-grooves are formed into a V shape and have an optical depth of $\lambda/6$ to $\lambda/5$ ($\lambda$ is the wavelength of the light used). In accordance with the invention, not ony a stable cross track counting is realized, but also the tracking signal is not practically varied with variations in the depth of the guide-grooves, thereby ensuring a highly accurate and stable tracking control.

15 Claims, 3 Drawing Sheets

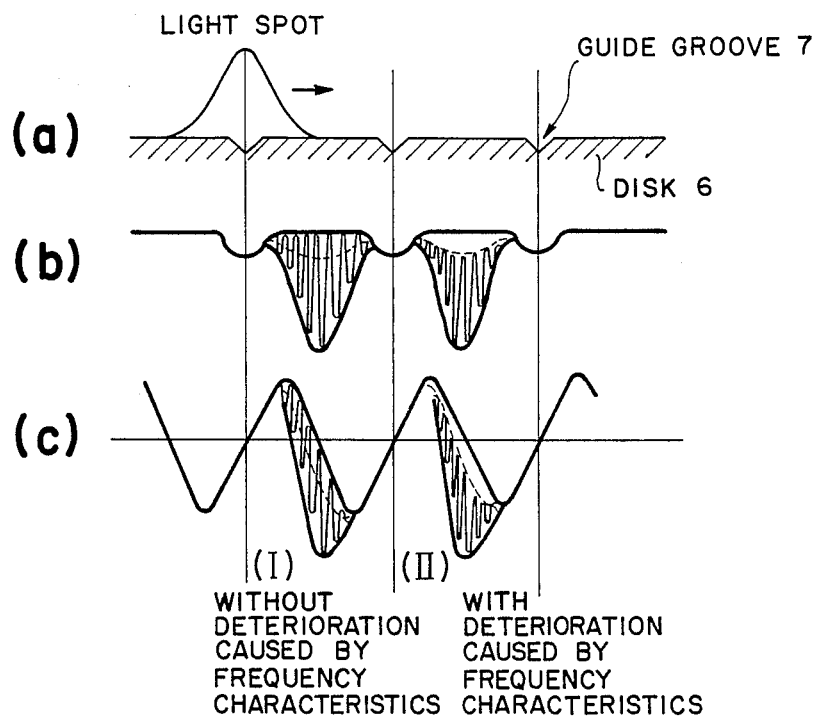
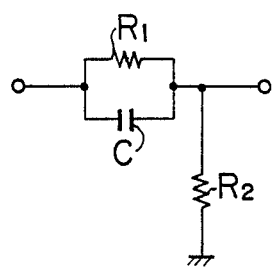
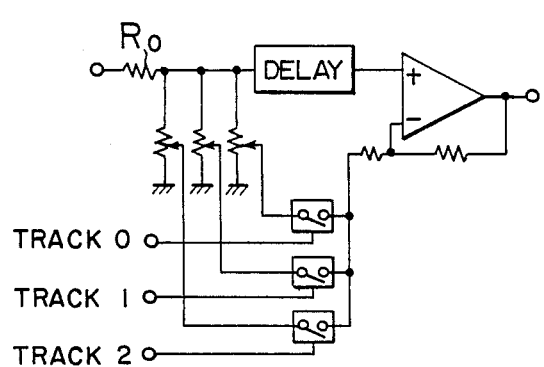

OPTICAL MEMORY APPARATUS USING AN OPTICAL DISC HAVING GUIDE-GROOVES OF V-SHAPE AND PREDETERMINED OPTICAL DEPTH AND ACCESS METHOD THEREFOR

BACKGROUND OF THE INVENTION

The present invention relates to an optical memory apparatus employing an optical disc in which information is recorded on the lands between guide-grooves and more particularly to an optical memory apparatus which is capable of optimizing a track cross signal (information reading signal used for cross track counting purposes) and a tracking signal of the diffracted light push-pull type and which is well adapted to an access method of a cross track counting system.

The known optical disc access methods include a cross track counting method in which no external scale is used but tracks formed on an optical disc itself are used as an internal scale so that the number of the tracks traversed by a spot of light during an access operation is counted directly to position an optical head (the light spot) on the desired track. According to this method, as disclosed in U.S. Pat. No. 4,607,358, during the passage (crossing) of the guide grooves (guide tracks), a tracking signal and an information reading signal (track cross signal) including the guide-groove level are both utilized to determine the direction of passage of the light spot and count the number of the guide grooves passed, thereby performing the access operation.

The method of this U.S. Pat. No. 4,607,358 is directed to the optical discs of the groove recording type in which information is recorded along the guide grooves of an optical disc and therefore the guide-groove level must be preset to about 80 to 90% in order to ensure the desired information signal level and to ensure a tracking signal. In this case, the depth of the guide-grooves of the V-shape type is on the order of $\lambda/8$ ($\lambda$ is the working wavelength). However, where the cross track counting is effected by using an optical disc having such guide-grooves, there is a disadvantage that the degree of modulation of the guide-groove level signal is as small as 10 to 20% and the guide-groove level signal cannot be detected with a satisfactory S/N ratio thus failing to satisfactorily obtain a polarity signal indicative of the direction of passage of the track.

On the other hand, U.S. Ser. No. 685,123 proposes a method in which information is recorded on the lands between guide-grooves. However, the depth of the guide-grooves is on the order of $\lambda/8$ and the modulation degree of the guide-groove level signal is as small as in the case of the previously mentioned U.S. Patent. Thus, in order to effect the cross track counting, there is a difficulty from the safety point of view and it is difficult to use the cross track counting.

SUMMARY OF THE INVENTION

It is an object of the present invention to provide an optical memory apparatus of the inter-groove recording type capable of ensuring a stable cross track counting.

It is another object of the invention to provide an inter-groove recording optical memory apparatus in which practically a tracking signal is not varied with variations in the depth of the guide-grooves and which is capable of performing a tracking control stably with a high degree of accuracy and ensuring a stable cross track counting.

In accordance with one feature of this invention, an optical memory apparatus includes an optical disc having guide grooves and information recording lands arranged between the guide-grooves and the depth of the guide grooves is suitably selected to increase the degree of modulation of a track cross signal, thereby accomplishing a stable cross track counting through the use of the track cross signal and a tracking signal.

In this case, the track cross signal is an information reading signal which is used along with the tracking signal for the cross track counting purposes and its modulation degree is an absolute value of the difference between the level when a spot of light is positioned on the guide-groove (or the guide-groove level on the groove) and the level when the light spot is positioned between the guide-grooves (or the guide-groove level between the grooves). For example, where a split photosensor is used such that a tracking signal is obtained from the difference between its outputs and an information reading signal is obtained from the sum of its outputs, the guide-groove level on the groove and the guide-groove level between the grooves correspond respectively to the maximum value (or the minimum value) and the minimum value (or the maximum value) of the sum of the outputs produced from the bisplit photosensor in response to the passage of the light spot through the guide-groove. It is to be noted that in order to eliminate the effect for example of the variations in reflectivity among different optical discs to be used, the tracking signal and the track cross signal are normalized with an information reading signal obtained in the absence of any guide-groove.

In accordance with the first feature of the invention, the modulation degree of the track cross signal is selected to be in the range of 30 to 60%. In this range, the amount of variation of the tracking signal is less than 3% and the tracking signal and the track cross signal are utilized in such a manner that each time the light spot passes the guide-groove a signal indicative of the direction of its passage is detected stably, thereby performing a stable cross track counting.

In accordance with another feature of the invention, the guide-grooves are formed into a V shape and their optical depth is selected to be between $\lambda/6$ and $\lambda/5$. Here, the term optical depth represents the product of the refractive index of the substrate or protective layer of the optical disc and the depth and it is hereinafter referred to as a depth. Designated by $\lambda$ is the wavelength of the light source used. By forming the guide-grooves into a V shape and selecting their depth between $\lambda/6$ and $\lambda/5$, it is possible to select the modulation degree of the guide-groove level signal (track cross signal) as high as up to 50% and at this time the tracking signal is the maximum.

Also, due to the use of the inter-groove recording in this invention, the level of an information signal is not subjected greatly to the effect of the guide-groove depth and there is no danger of any malfunctioning of the cross track counting, thus making it possible to stably obtain an information signal.

These and other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 4 a& b is a diagram used to explain the effectiveness of the emphasis circuit.

FIGS. 5A and 5B are diagrams explaining the arrangement of the emphasis circuit.

DESCRIPTION OF THE PREFERRED EMBODIMENTS

Figure 1:
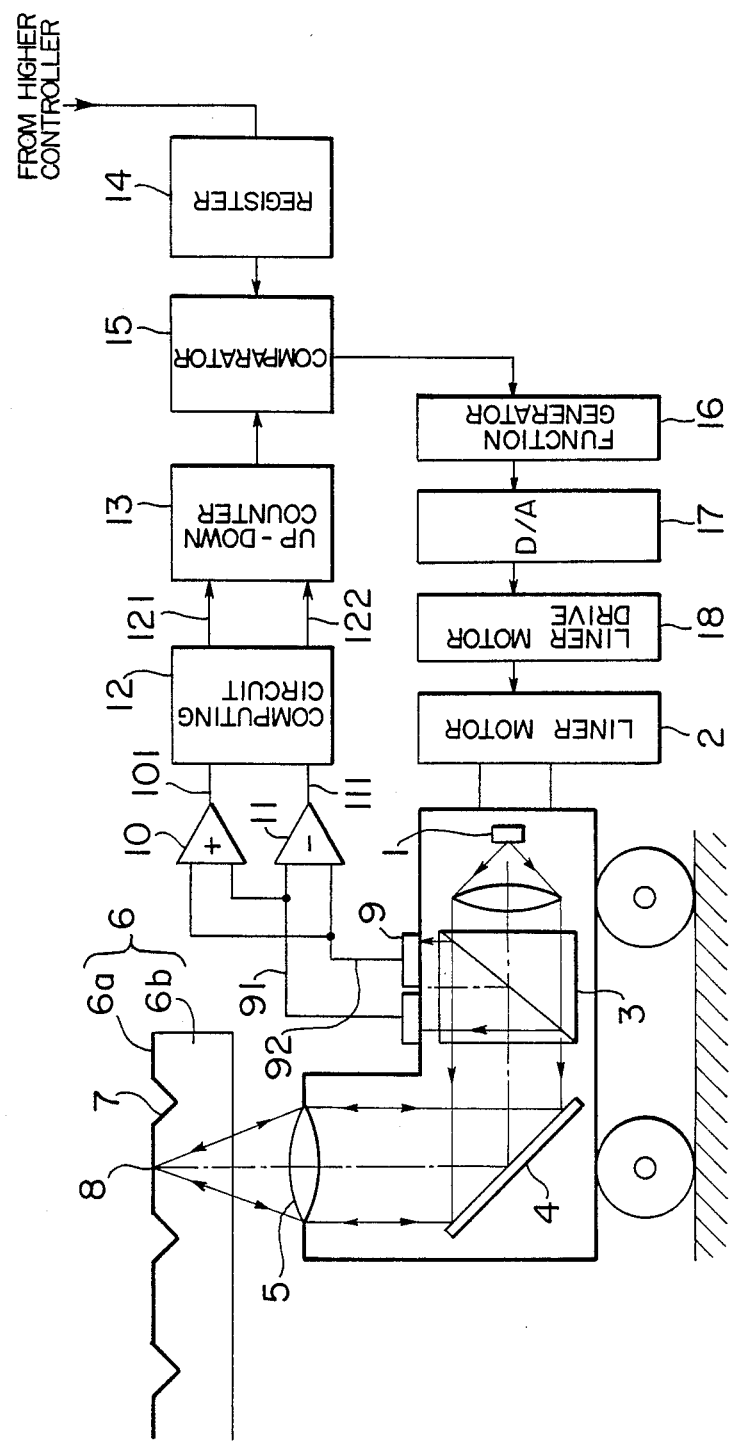
FIG. 1 is a schematic block diagram showing an embodiment of an optical memory apparatus according to the invention.

A preferred embodiment of the invention will now be described with reference to FIG. 1. An optical head including a semiconductor laser 1 is made integral with a linear motor 2 so as to ensure a rapid access and the optical head is moved by the linear motor 2 in the radial direction of an optical disc 6. The light beam emitted from the semiconductor laser 1 is passed through a prism 3, bent perpendicularly by a mirror 4 (e.g., a galvano mirror) and condensed into a spot of beam of about 1 μm on the disc 6 through a condenser lens 5. Preliminarily formed on a substrate 6b of the disc 6 are V-shaped guide grooves 7 in spiral or concentrical form and a recording film 6a is also vapor deposited on the substrate 6b. The guide grooves need not have a completely continuous form but they may include any interrupted portions (mirror regions) compensating track offset and it is only necessary that they are substantially in a continuous form. Information is recorded on each land 8 between the guide-grooves. The recording method may be any of the perforated recording, photomagnetic recording, phase variation recording, etc. Each land forming a recording track is divided into a plurality of sectors and the leading part of each sector is preformatted with such address information as a track address and sector address. The light reflected from the disc 6 is passed through the condenser lens 5 and the mirror 4 and then its light path is separated into two light paths. The separated light beams are received by a split photosensor 9 whose two outputs 91 and 92 are applied to an adder 10 as well as a differential amplifier 11, thereby generating an information reading signal 101 and a tracking signal 111, respectively. The information reading signal 101 and the tracking signal 111 are applied to a computing circuit 12 for cross track counting purposes so that a track passage pulse 121 or 122 corresponding to the direction of movement of the optical head is generated and applied to an up-down counter 13. While the construction of the computing circuit 12 is disclosed in the previously mentioned U.S. Pat. No. 4,607,358 and will not be described in detail, the computing circuit 12 receives the information reading signal (track cross signal) 101 and the tracking signal 111 to compare the phase of the signals so that each time the light spot traverses the guide-groove a pulse 121 or 122 is generated in correspondence to the direction of its passage.

The difference address between the address of the track on which the light spot is presently positioned or the current address and the address of the target track or the target address from higher controller is stored in a register 14. A comparator 15 compares the difference address from the register 14 and the content of the up-down counter 13 and the resulting content is applied to a function generator 16 including an ROM (read only memory) which in turn generates a speed curve signal (speed control signal). The speed curve signal is considered to be optimal when the maximum speed is proportional to the square root of the position. The output of the function generator 16 is applied to a digital-analog converter 17 which in turn generates and applies an analog signal to a linear motor driver circuit 18. By thus driving the linear motor 2 which moves the optical head at a high velocity, the access operation is performed while effecting the cross track counting. The linear motor 2 is subjected to the speed control during the cross track counting and, after the target address has been reached thus causing the output of the comparator 15 to go to "0", the changeover from the speed control to a position control is effected and the linear motor 2 is driven by the tracking signal 111.

The position control should preferably be performed by the use of a two-step tracking servo so designed that a tracking actuator disposed in the optical head, e.g., light deflecting actuating means for rotating the mirror 4 or a two-dimensional actuator for moving the lens 5 in its optical axis direction and perpendicular direction, is driven by a tracking signal 111 so that the movement of the tracking actuator is detected and fed back to the linear motor 2. This two-step tracking servo is disclosed in the previously mentioned U.S. Pat. No. 4,607,358. Although not shown in FIG. 1, there is of course provided an automatic focusing mechanism in which a focal deviation signal is detected through the use of the reflected light from the optical disc and the lens 5 is moved in the direction of its optical axis in accordance with the signal, thereby effecting the focussing.

The disc having the V-shaped guide-grooves used in the embodiment of FIG. 1 will now be described with reference to FIG. 2. In the Figure, the abscissa represents the depth d of the guide-grooves and the ordinate represents the relative level of the tracking signal 111 and the guide-groove level of the information reading signal 101, respectively. The relative level is a calculated or actually measured value obtained by taking as 100% the sum of the outputs of photosensing elements $D_1$ and $D_2$ of the split photosensor in the absense of any guide groove. The calculations were made by varying the depth d of the grooves having a V shape and a groove width of 0.4 μm (the solid lines show the calculated values). The actual measured values obtained by varying the guide-groove recording laser power, using several different depths, measuring the depths by a measuring method, i.e., the so-called diffraction method disclosed in Japanese Unexamined Publication No. 57-187604 and measuring the corresponding tracking signals (marked O) and guide-groove levels (marked Δ) of information reading signals. The laser wavelength of the optical head used was 0.83 μm and the numerical aperture N.A. of the condenser lens was 0.6. Comparatively good equality is found between the calculated values and the measured values.

Figure 2:
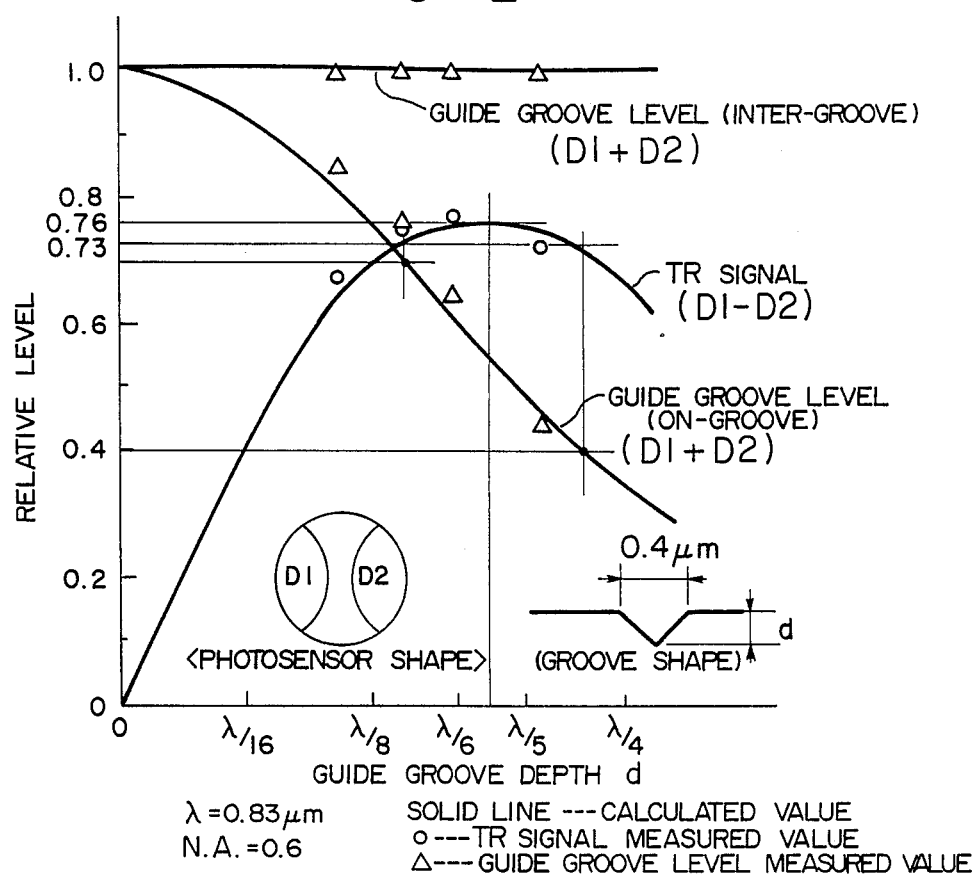
FIG. 2 is a graph showing the relation between the guide-groove depth and the tracking signal and the guide-groove level signal (track cross signal), respectively.

From FIG. 2 it will be seen that where the depth of the guide-grooves is in the range of about λ/6 and λ/5, the normalized tracking signal shows the maximum value of 76% and it also shows reduced variations against variations in the guide-groove depth. In order to effect the cross track counting, it is necessary to detect the tracking signal stably. The rate of change of the tracking signal with variations in the groove depth is increased in the region below the point at which the tracking signal assumes a value of 73%, whereas in the region where the value of the tracking signal is over 73%, the amount of variation of the tracking signal is practically negligible (the amount of variation is 3%) and the tracking signal can be detected stably in this region.

Also, in this region the information reading signal (the track cross signal) used for cross track counting purposes is defined as an absolute value of the difference between the previously mentioned relative guide-groove level (inter-groove) and guide-groove level (on-groove). This signal has a level in the range between 30 and 60% in the above-mentioned region where the variation of the tracking signal is decreased. In this region, the track cross signal shows variations of ±15% on both sides of 45% and therefore the cross track counting can be stably effected, along with the detection of the tracking signal, by the use of known signal processing means. Thus, in the case of an optical disc having guide-grooves and adapted to effect the inter-groove recording, the range between 30 and 60% is the optimum one for the cross track signal.

Also, it will be seen from FIG. 2 that in the case of the V-shaped grooves, it is only necessary to select the guide-groove depth between $\lambda/6$ and $\lambda/5$ in order to increase the value of the tracking signal to the maximum. In the case of the conventional on-groove recording, due to the necessity of increasing the magnitude of recorded information signals, it is impossible to decrease the guide-groove level (on-groove) and therefore the guide-groove depth d is selected to be about $\lambda/8$ so as to obtain the modulation degree of 10 to 20%. In the case of the present embodiment, the guide-groove depth is selected between $\lambda/6$ and $\lambda/5$ so that the value of the tracking signal is increased by about 1.1 times and the value of the guide-groove level signal (the track cross signal) is increased by about 2.5 times than previously, thereby effecting the cross track counting stably.

In the case of a DRAW optical disc, for example, usually the formation of recesses (pits) decreases the guide-groove level and particularly disturbance is caused during the cross track counting in the case of the inter-groove recording in which information is recorded on the lands between the guide-grooves. To overcome this deficiency, a peak detecting circuit and an emphasis circuit such as described in the specification of Japanese patent application No. 60-165779 (U.S. Ser. No. 868,021) may be used in the information signal and tracking signal detecting system to prevent any level drop due to the pits.

Figure 3:
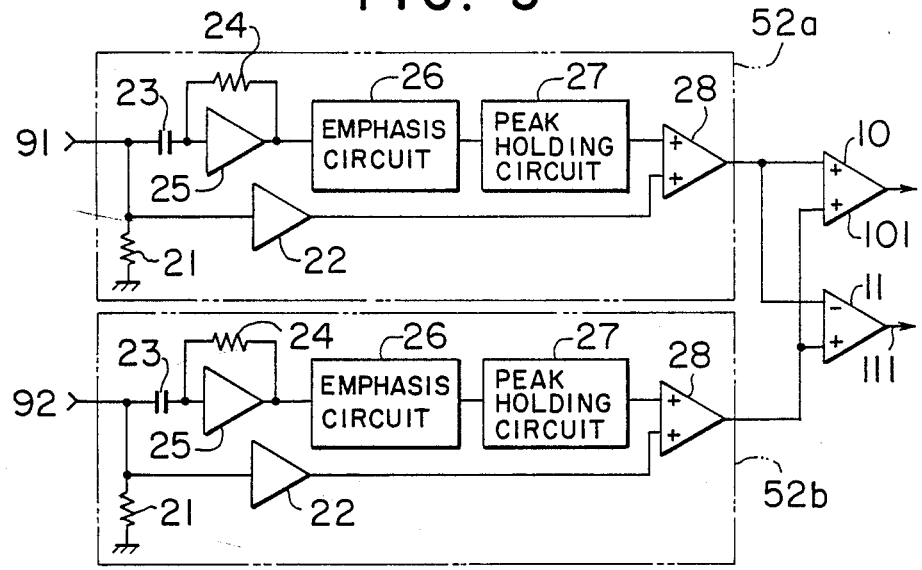
FIG. 3 is a diagram used to explain the offtrack detection circuit.

An examplary arrangement of such peak detecting circuit and emphasis circuit in the information reading signal and tracking signal detecting system will now be described with reference to FIG. 3. A circuit 52a for the output of one element of the split photosensor 9 and a circuit 52b for the output of another element are identical, and the following describes only the circuit 52a. The output of the element of the split photosensor 9 is subjected to current-voltage conversion by a resistor 21, and after its d.c. component has been blocked by a low-band amplifier 22 and capacitor 23 the signal is applied to a high-band amplifier 25 having a feedback resistor 24. The output of the high-band amplifier 25 is processed by an emphasis circuit 26 and a peak holding circuit 27, and it is added to the output of the low-band amplifier 22 by an adder 28. The outputs of the circuits 52a and 52b are fed to the differential amplifier 11, and a track error detect signal 111 is produced. The effects of the emphasis circuit and peak holding circuit will be described using FIG. 4. In FIG. 4, waveform (a) shows the relationship between the light spot and the guide groove 7 on the disc 6, waveform (b) shows a record of information made between grooves by the circuits 52a and 52b, and waveform (c) shows the output of the differential amplifier 11. The left-hand waveform (I) shows the case where the mixing information signal has no decay in the frequency characteristics, while the right-hand waveform (II) shows the case of a decay in the frequency characteristics. In the case of (I), the emphasis circuit is not required, and the peak holding circuit is required. If the peak holding circuit is absent, the waveform will become as shown by the dashed line, with the result of a varying guide-groove level in (b) and a falling tracking error detect signal amplitude in (c). The above problems can be solved by use of the peak holding circuit. However, if deterioration in the frequency characteristics occurs as in (II), the guide-groove level will vary and the tracking error detect signal amplitude will fall even if the peak holding circuit is used. The emphasis circuit can be arranged using a phase-lead circuit or cosine equalizing circuit as shown by FIG. 5A and FIG. 5B. In the case of FIG. 5B, the optical disc has the frequency characteristics which vary largely in an inner section and outer section on the disc, and the degree of emphasis can be optimized by varying the gain for the inner and outer sections with reference to the track address so as to modify the uneven frequency characteristics. The guide-groove level (reflection intensity) signal 101 used for the direction discrimination is produced by adding the outputs of the circuits 52a and 52b by the adder 10. This signal causes the guide-groove level (reflection intensity) signal to vary when the coexistent information signal decays in the frequency characteristics, as has been explained on FIG. 4, particularly the variation increases in inter-groove recording, resulting in problems such as the occurence of erroneous cross track counting. However, employment of the emphasis circuit stabilizes the guide-groove level signal, allowing the access operation by the method of the stable cross track count system.

From the foregoing description it will be seen that in accordance with the invention, by virtue of the fact that the guide-groove depth is selected between $\lambda/6$ and $\lambda/5$ and information is recorded on the lands between the guide-grooves, there is the effect of increasing the value of the tracking signal to the maximum, increasing the value of the guide-groove level signal used for cross track counting purposes to 50% and preventing any deterioration in the level of the information signal, thereby performing the cross track counting stably.

What we claim is:
1. An optical memory apparatus comprising:
    an optical disc having a plurality of guide grooves in spiral or concentric form and a plurality of tracks each arranged between adjacent two of said guide-grooves for recording information thereon;
    an optical head for projecting a spot of light on said optical disc;
    detecting means for detecting light reflected from said optical disc to deliver a reading signal and a tracking signal, respectively; and
    access means connected to said detecting means and including a moving device for controlling a relative radial movement of said light spot and said optical disc, and control means for receiving said reading signal and said tracking signal to count the number of said guide-grooves traversed by said light spot during said radial movement to apply a control signal to said moving device to position said light spot on desired one of said tracks;

wherein each of said guide grooves has an optical depth between $\lambda/6$ and $\lambda/5$ (where $\lambda$ is a wavelength of the light projected from said optical head), and the degree of modulation of said reading signal delivered by said detecting means during said radial movement is in the range between 30 and 60%.

2. An apparatus according to claim 1, wherein said detecting means comprises photosensor means including at least two photosensors for receiving the light from said optical disc, an adder circuit connected to said photosensor means to derive said reading signal, and a differential circuit connected to said photosensor means to deliver said tracking signal.

3. An apparatus according to claim 2, wherein said photosensor means comprises split photosensor means whereby said reading signal is derived from a sum of outputs of said split photosensor means, and wherein said modulation degree is obtained by normalizing a difference between maximum and minimum values of sums of outputs of said split photosensor means obtained during said radial movement by a sum of outputs of said split photosensor means obtained in the absense of said guide-grooves.

4. An apparatus according to claim 1, wherein said control means comprises a passage detecting circuit for receiving said reading signal and said tracking signal whereby each time said light spot traverses one of said guide-grooves a signal corresponding to a direction of the passage thereof is generated, a counting circuit for receiving the output of said passage detecting means to count the number of said guide-grooves traversed during said radial movement, and a control signal generating circuit for receiving a content of said counting circuit and a value corresponding to said desired track deliver said control signal.

5. An apparatus according to claim 4, wherein said control signal generating circuit comprises a comparator for receiving the content of said counting circuit and said value corresponding to said desired track, a function generator for receiving an output from said comparator to generate a speed control signal in accordance with a speed curve stored therein, and a digital-analog converter for receiving the output of said function generator.

6. An optical memory apparatus comprising:
an optical disc having a plurality of guide grooves in spiral or concentric from and a plurality of tracks each arranged between adjacent two of said guide-grooves for recording information thereon;
an optical head for projecting a spot of light on said optical disc;
detecting means for detecting light reflected from said optical disc to deliver a reading signal and a tracking signal, respectively; and
access means connected to said detecting means and including a moving device for controlling a relative radial movement of said light spot and said optical disc, and control means for receiving said reading signal and said tracking signal to count the number of said guide-grooves traversed by said light spot during said radial movement to apply a control signal to said moving device to position said light spot on desired ones of said tracks;
wherein each of said guide grooves has a optical depth between $\lambda/6$ and $\lambda/5$ (where $\lambda$ is a wavelength of the light projected from said optical head) and the degree of modulation of said reading signal delivered by said detecting means during said radial movement is in the range of between 30 and 60% and wherein each of said guide-grooves is formed substantially into a V shape in section.

7. An apparatus according to claim 6, wherein said detecting means comprises photosensor means including at least two photosensors for receiving the light from said optical disc, an adder circuit connected to said photosensor means to derive said reading signal, and a differential circuit connected to said photosensor means to deliver said tracking signal.

8. An apparatus according to claim 6, wherein said control means comprises a passage detecting circuit for receiving said reading signal and said tracking signal whereby each time said light spot traverses one of said guide-grooves a signal corresponding to a direction of the passage thereof is generated, a counting circuit for receiving the output of said passage detecting means to count the number of said guide-grooves traversed during said radial movement, and a control signal generating circuit for receiving a content of said counting circuit and a value corresponding to said desired track to deliver said control signal.

9. An apparatus according to claim 8, wherein said control signal generating circuit comprises a comparator for receiving the content of said counting circuit and said value corresponding to said desired track, a function generator for receiving an output from said comparator to generate a speed control signal in accordance with a speed curve stored therein, and a digital-analog converter for receiving the output of said function generator.

10. An optical memory apparatus comprising:
an optical disc having a plurality of guide grooves arranged in spiral or concentrical form and having an optical depth in the range between $\lambda/6$ and $\lambda/5$, and a plurality of flat tracks each arranged between adjacent two of said guide-grooves for recording information thereon;
an optical head for projecting a spot of light on said optical disc;
detecting means for detecting light reflected from said optical disc to deliver a reading signal and a tracking signal, respectively;
access means connected to said detecting means and responsive to said reading signal and said tracking signal to count the number of said guide-grooves traversed by said light spot to position said light spot on desired one of said tracks; and
tracking control means for receiving said tracking signal to cause said light spot to follow said desired track, said $\lambda$ representing a wavelength of the projected light from said optical head.

11. An apparatus according to claim 10, wherein said detecting means comprises photosensor means including at least two photosensors for receiving the reflected light from said optical disc, an adder circuit connected to said photosensor means to derive said reading signal, and a differential circuit connected to said photosensor means to deliver said tracking signal.

12. An apparatus according to claim 11, wherein each of said guide-grooves is formed substantially into a V shape in section.

13. An apparatus according to claim 12, wherein said tracking control means comprises a passage detecting circuit for receiving said reading signal and said tracking signal whereby each time said light spot traverses one of said guide-grooves a signal corresponding to a direction of the passage thereof is generated, a counting circuit for receiving the output of said passage detecting means to count the number of said guide-grooves traversed during said radial movement, and a control signal generating circuit for receiving a content of said counting circuit and a value corresponding to said desired track to deliver said control signal.

14. An apparatus according to claim 13, wherein said control signal generating circuit comprises a comparator for receiving the content of said counting circuit and said value corresponding to said desired track, a function generator for receiving an output from said comparator to generate a speed control signal in accordance with a speed curve stored therein, and a digital-analog converter for receiving the output of said function generator.

15. An access method for an optical memory apparatus comprising the steps of:

employing an optical disc having a plurality of guide-grooves in spiral or concentrical form, each of said guide grooves having an optical depth between $\lambda/6$ and $\lambda/5$;

arranging a split photosensor to detect a deviation of a spot of light of wavelength $\lambda$ from one of said guide-grooves;

generating a first signal corresponding to a sum of outputs of said split photosensor and a second signal corresponding to a difference between the outputs of said split photosensor;

a value obtained by normalizing a difference between maximum and minimum values of sums of outputs generated from said split photosensor by the passage of said light spot through said tracks by a sum of outputs of said split photosensor generated in the absence of said guide-grooves being in the range between 30 and 60%; and using said first and second signals to count the number of said guide-grooves traversed by said light spot to position said light spot on a desired one of said tracks.

* * * * *